US005719565A

United States Patent [19]
Tsuno et al.

[11] Patent Number: 5,719,565
[45] Date of Patent: Feb. 17, 1998

[54] ANTI-SKID CONTROLLER HAVING ACCURATE ROAD SURFACE DETECTION CAPABILITIES

[75] Inventors: Tadaaki Tsuno, Obu; Shoichi Masaki, Chiryu, both of Japan

[73] Assignee: Nippndenso Co., Ltd., Kariya, Japan

[21] Appl. No.: 677,371

[22] Filed: Jul. 5, 1996

[30] Foreign Application Priority Data

Jul. 7, 1995 [JP] Japan ................. 7-172078

[51] Int. Cl.$^6$ ............................................. G08G 1/09
[52] U.S. Cl. ............................ 340/905; 340/901; 340/442; 364/424.05; 364/426.01
[58] Field of Search ................................ 340/442, 444, 340/438, 425.5, 905, 901; 364/424.01, 424.05, 426.01, 426.04; 303/160, 166, 171, 173

[56] References Cited

U.S. PATENT DOCUMENTS

| | | | |
|---|---|---|---|
| 4,651,290 | 3/1987 | Masaki et al. | 364/550 |
| 4,683,537 | 7/1987 | Matsuda | 364/426 |
| 4,748,564 | 5/1988 | Matsuda | 364/426 |
| 5,001,640 | 3/1991 | Matsumoto et al. | 364/426.02 |
| 5,019,985 | 5/1991 | Yasuno et al. | 364/426.02 |
| 5,070,459 | 12/1991 | Van Zanten et al. | 364/426.02 |
| 5,159,555 | 10/1992 | Wada | 364/424.05 |
| 5,444,621 | 8/1995 | Matsunaga et al. | 364/424.05 |
| 5,480,221 | 1/1996 | Morita et al. | 303/113.5 |
| 5,487,437 | 1/1996 | Avitan | 180/6.5 |
| 5,511,862 | 4/1996 | Fujioka | 303/113.4 |
| 5,521,594 | 5/1996 | Fukushima | 340/901 |

FOREIGN PATENT DOCUMENTS

| | | | |
|---|---|---|---|
| 6-027679 | 4/1994 | Japan | G01M 17/00 |
| 7-43134 | 2/1995 | Japan | G01B 11/26 |
| 7-246925 | 9/1995 | Japan | B60T 8/70 |

Primary Examiner—Brent A. Swarthout
Assistant Examiner—Van T. Trieu
Attorney, Agent, or Firm—Cushman, Darby & Cushman IP Group of Pillsbury, Madison & Sutro LLP

[57] ABSTRACT

The wheel speed of each wheel of a vehicle is calculated based on wheel speed signals from wheel speed sensors. The wheel acceleration of each wheel is calculated based on the wheel speed. High frequency components of the wheel acceleration of each wheel are filtered using a high-pass filter to obtain the frequency components of the wheel acceleration which are due only to the road surface condition. Then, a variance of the filtered wheel acceleration is calculated, and a bad road condition determination is executed using the calculated variance. Anti-skid control is carried out based on the bad road condition determination result to provide improved braking control in off-road conditions.

14 Claims, 15 Drawing Sheets

WHEEL ACC. BEFORE FILTERING (DVW)

WHEEL ACC. AFTER FILTERING (DVWF)

VARIANCE (DVWB)

FIG. 12

| P | SOL. DRIVING PATTERN | | |
|---|---|---|---|
| 0 | CONTIN. PRESSURE REDUCTION | INC. / MAINT. / DEC. | |
| 1 | PULSED PRESSURE REDUCTION | INC. / MAINT. / DEC. | TR1 TH1 |
| 2 | PRESSURE MAINTAIN | INC. / MAINT. / DEC. | |
| 3 | PULSED PRESSURE INCREASE | INC. / MAINT. / DEC. | PULSE COUNT n=1  2  N3=1  N3<br>TA3 TH3  PATTERN COMPLETE |
| 4 | CONTIN. PRESSURE INCREASE | INC. / MAINT. / DEC. | |

ANTI-SKID CONTROLLER HAVING ACCURATE ROAD SURFACE DETECTION CAPABILITIES

CROSS REFERENCE TO RELATED APPLICATION

This application is based on and claims priority from Japanese Patent Application No. Hei-7-172078, the contents of which are incorporated herein by reference.

BACKGROUND OF THE INVENTION

1. Field of the Invention

The present invention relates to a road surface condition detector for detecting a road surface condition based on wheel acceleration during vehicle cruising.

2. Description of Related Art

In recent years, there have been remarkable improvements in electronic control technology for vehicle suspension systems. An anti-skid controller, a suspension controller and the like are typical well-known examples of such technology.

Among such technology, the anti-skid controller which can improve brake performance is being installed in increasing numbers in off-road vehicles. Thus, the anti-skid controller is also being adapted for use in off-road vehicles.

However, compared with normal flat paved roads, off-road surfaces on which the off-road vehicles travel have very complicated surface patterns and are highly uneven and so, it would not be easy for conventional anti-skid controllers to deal with such off-road surfaces. To put it concretely, there is a need to shorten braking distances on off-road surfaces that have gravel, dirt and the like on them.

As one measure for improving brake performance on bad roads such as off-roads and the like, Japanese Patent Application Laid-Open Publication No. Sho-60-596 discloses a technology for shortening braking distance by detecting a bad road through variance analysis of a wheel acceleration signal and then performing anti-skid control based on a result from such detection.

However, in the above-described technology, since the variance calculated from the wheel acceleration includes vehicle deceleration and brake fluctuation components, detection of uneven road surfaces having relatively smaller uneven portions in which wheel acceleration varies within a small range will be difficult.

That is, as shown in FIG. 19, there will be a wheel deceleration when a brake is depressed at time t1 while travelling at a constant speed at which the wheel acceleration is nearly zero G. However, since a component of the wheel deceleration (that is, vehicle deceleration) is added to the variance, accurate detection of the gravel road or the like is difficult.

Moreover, commencing anti-skid control at a time t2 after a predetermined period of time has lapsed after depressing the brake results in vehicle wheel acceleration fluctuation (brake fluctuation) and thus, accurate detection of gravel roads and the like will be again difficult because the components of such fluctuation will be added to the variance.

In other words, because of the factors described above, accurate detection of bad roads such as gravel roads and the like is difficult by just using conventional technology.

SUMMARY OF THE INVENTION

In view of the foregoing problems in the prior art in mind, it is a primary object of the present invention to provide a road surface condition detector which can accurately detect braking conditions on bad roads such as off-roads and the like.

To achieve this aim, a first aspect of the present invention provides a road surface condition detector which includes a wheel acceleration detection unit for generating a wheel acceleration signal representative of wheel acceleration of a wheel of a vehicle, a high frequency component extraction unit for extracting high frequency components of the wheel acceleration signal, a dispersion condition detection unit for determining a dispersion value indicative of a dispersion condition of the high frequency components and a road surface condition detection unit for determining a road surface condition based on the dispersion value.

When the road surface condition is detected based on simply the dispersion value of the wheel acceleration, accuracy of detecting the road surface condition, which is affected by vehicle deceleration and brake fluctuation components, tends to decline. It must be noted here that the frequencies of the vehicle deceleration and the brake fluctuation components are relatively low compared with the frequency components of the road surface condition.

In this way, with the present invention, because only the high frequency components of the wheel acceleration are extracted and used, road surface condition can be detected accurately based on the dispersion value of the high frequency components.

Another aspect of the present invention provides a road surface condition detector in which the wheel acceleration detection unit generates the wheel acceleration signal based on a wheel speed signal from a speed sensor coupled to the wheel.

An additional aspect of the present invention provides a road surface condition detector in which the wheel acceleration detection unit determines the wheel acceleration of each wheel of the vehicle and the road surface condition detection unit detects the road surface condition of each wheel of the vehicle.

Therefore, for example, anti-skid control can be performed accurately for each wheel and thus, the vehicle can be controlled properly.

An additional aspect of the present invention provides a road condition detector in which the high frequency component extraction unit includes one of a high-pass filter unit, a bandpass filter unit and a differential filter unit for extracting the high frequency components of the wheel acceleration signal.

A further aspect of the present invention provides a road condition detector wherein the high frequency component extraction unit extracts high frequency components of the wheel acceleration signal by using filter characteristics that can be adjusted in accordance with at least one of a vehicle speed of the vehicle and a control condition of the vehicle.

In this way, since filter characteristics used for the high frequency component extraction unit are adjusted in accordance with the vehicle speed and/or the control condition of the vehicle, the road surface condition can be accurately detected.

Another aspect of the present invention provides a road condition detector wherein the road surface condition detection unit is for determining the road surface condition by comparing the dispersion value with a determination level that can be adjusted in accordance with at least one of a vehicle speed of the vehicle and a control condition of the vehicle. In this way, since the determination level is adjusted in accordance with the vehicle speed and/or the control condition, the road surface condition can be accurately detected.

It must be noted here that the control condition may be, for example, the execution of anti-skid control or the suspension control. Thus, the road surface condition can be detected more accurately in accordance with such a control condition.

A further aspect of the present invention provides a road surface condition detector which includes a variation amount computation unit for determining a dispersion variation amount of the dispersion value determined by the dispersion condition detection unit. In this way, a single road surface variation such as a road bump or the like can be accurately detected. Also, it must be noted here that using the variance as the dispersion value enables the accurate detection of road surface changes.

BRIEF DESCRIPTION OF THE DRAWINGS

Additional objects and advantages of the present invention will be more readily apparent from the following detailed description of preferred embodiments thereof when taken together with the accompanying drawings in which:

FIG. 12 is a table of solenoid driving patterns in the first embodiment;

DETAILED DESCRIPTION OF THE PRESENTLY PREFERRED EXEMPLARY EMBODIMENTS

Preferred embodiments of the present invention are hereinafter described with reference to the accompanying drawings.

Figure 2:
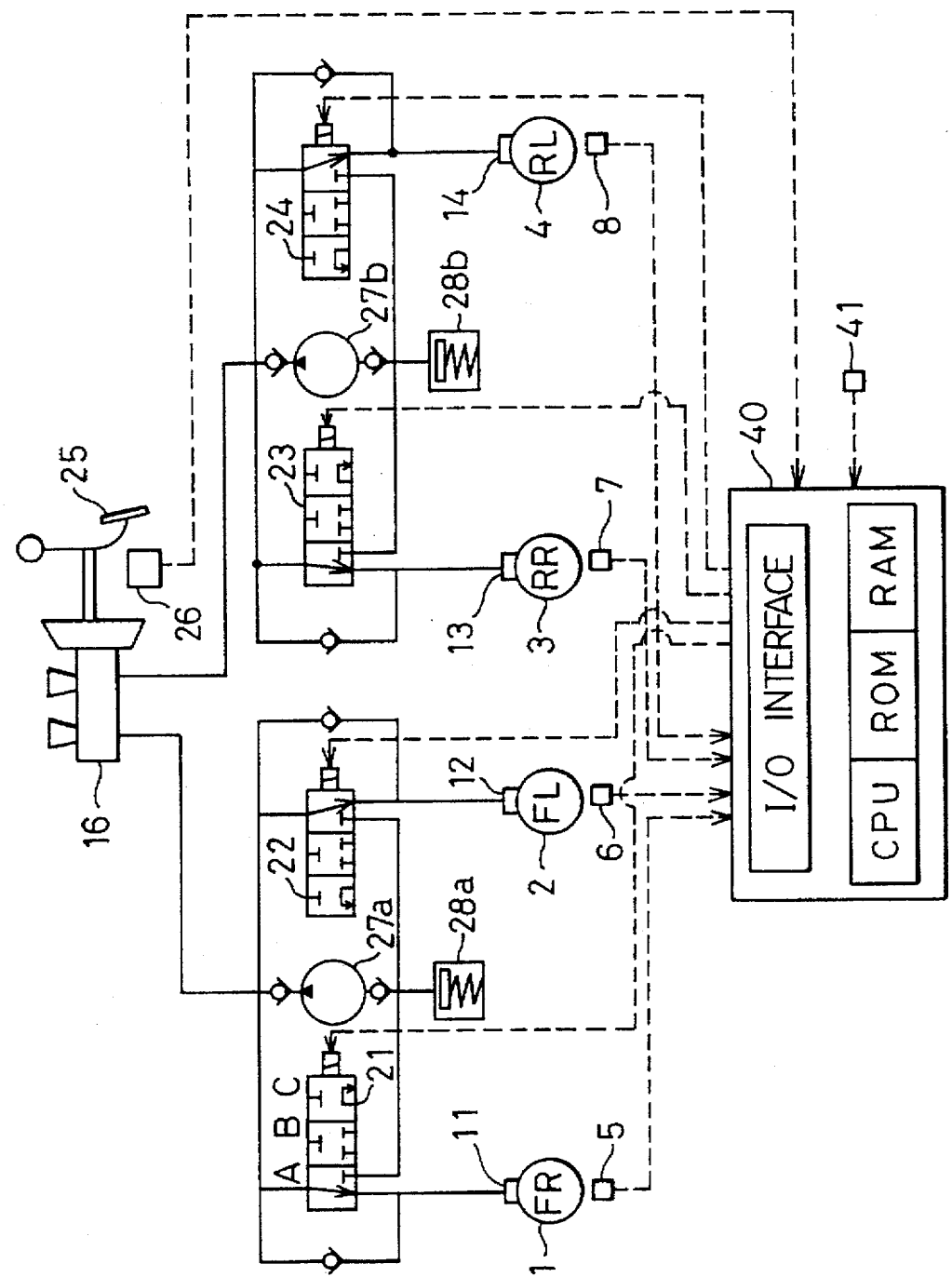
FIG. 2 is a schematic view of an overall construction of an anti-skid controller in which the road surface condition detector according to a first embodiment of the present invention is applied.

FIG. 2 illustrates an overall construction of an anti-skid controller in which a road surface condition detector of a first embodiment is applied. The first embodiment is used in a front engine rear drive vehicle.

Wheel speed sensors 5–8, which are electromagnetic type sensors, magnetoresistive type sensors or the like, are disposed at FR (front right) wheel 1, FL (front left) wheel 2, RR (rear right) wheel 3 and RL (rear left) wheel 4, respectively for generating pulse signals having frequencies corresponding to the rotation of wheels 1–4. Furthermore, hydraulic brake units (wheel cylinders) 11–14 are provided in the wheels 1–4 for applying braking forces on the same. Hydraulic pressure (fluid pressure) from a master cylinder 16 is transmitted to each of the wheel cylinders 11–14 via actuators 21–24 and respective fluid lines.

Depression of a brake pedal 25 is detected by a stop switch 26. When the brake pedal 25 is depressed and vehicle braking is started, the stop switch 26 generates an ON signal.

Reservoirs 28a, 28b are provided for the temporary storage of brake fluid discharged from each of the wheel cylinders 11–14 when pressures of the wheel cylinders 11–14 are reduced during anti-skid control. The brake fluid stored in the reservoirs 28a, 28b are pumped out by hydraulic pumps 27a, 27b which are driven by a motor (not shown) and discharged at a high pressure.

Actuators 21–24 are controlled by an electronic control unit (ECU) 40. These actuators 21–24 adjust brake hydraulic pressure applied on the wheel cylinders 11–14 during anti-skid control and control braking forces on wheels 1–4. Each of the actuators 21–24 is an electromagnetic type three-position valve which can be switched to a pressure increase mode, a pressure decrease mode and a pressure maintain mode. More specifically, wheel cylinder pressure of the wheel cylinder 11 is increased when the actuator 21 is in an A position, maintained when the actuator 21 is in a B position and reduced by releasing brake fluid therefrom to the reservoir 28a when the actuator 21 is in a C position. The same operation is also carried out by the other actuators 22–24. Also, it must be noted that these actuators 21–24 are in the pressure increase mode when not being actuated and switch to either the pressure maintain mode or the pressure decrease mode when actuated depending on the level of actuation current.

The electronic control unit 40 is made up of a microprocessor which includes CPU, ROM, RAM, an input-output (I/O) interface and the like. The electronic control unit 40 receives electric power from a power source (not shown) when an ignition switch 41 is actuated, receives signals from the wheel speed sensors 5–8 and the stop switch 26, performs control calculations and the like for controlling braking force and provides driving control signals to the actuators 21–24.

Next, the anti-skid control process executed by the electronic control unit 40 is explained with reference to FIGS. 3–12.

Figure 3:
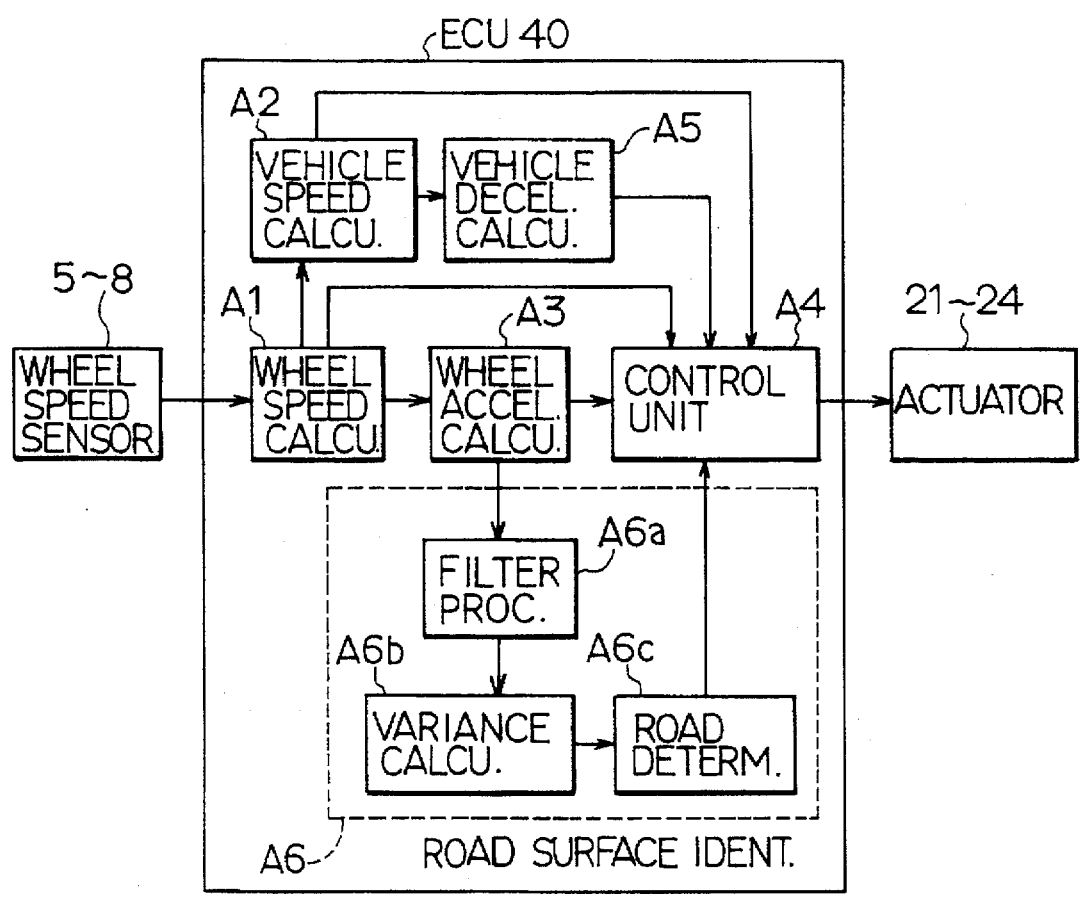
FIG. 3 is a block diagram of the road condition detector according to the first embodiment.

First, the control process of the present embodiment is explained hereinafter with reference to the block diagram of FIG. 3.

Signals from the wheel speed sensors 5–8 are provided to a wheel speed calculation unit A1 and then, the wheel speed calculated by the wheel speed calculation unit A1 is provided to a vehicle speed calculation unit A2, a wheel acceleration calculation unit A3 and a control unit A4.

The vehicle speed calculated by the vehicle speed calculation unit A2 is provided to the control unit A4 and an estimated vehicle deceleration calculation unit A5. The estimated vehicle deceleration calculated by the estimated vehicle deceleration calculation unit A5 is provided to the control unit A4.

Wheel acceleration calculated by the wheel acceleration calculation unit A3 is provided to the control unit A4 and a filter processor A6a of a road surface identifier A6.

Inside the road surface identifier A6, the wheel acceleration processed by the filter processor A6a is provided to a variance calculation unit A6b and variance calculated by the variance calculation unit A6b is provided to a bad road determination unit A6c. A result of determination by the bad road determination unit A6c is provided to the control unit A4.

Then, based on the results of the calculations of the above-described units, the control unit A4 generates outputs for controlling the actuators 21–24 to control brake hydraulic pressure of the wheels 1–4.

Figure 4:
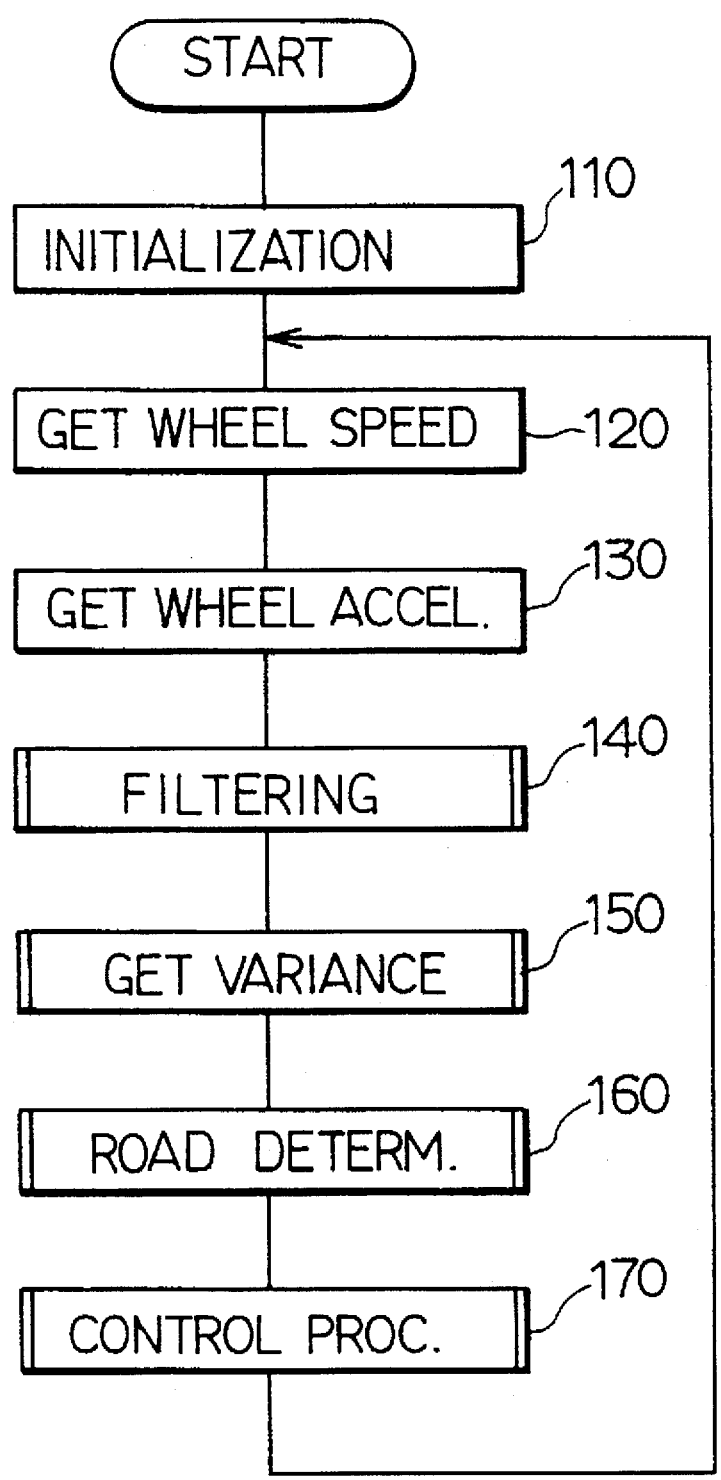
FIG. 4 is a flowchart of a main routine of the first embodiment.

Next, the overall anti-skid control process of the first embodiment is explained with reference to the flowchart shown in FIG. 4. The execution of this process commences when the ignition switch 41 is actuated.

First, step 110 initializes the various flags and counters.

Then, step 120 calculates the wheel speed of each of the wheels 1–4 based on wheel speed signals from the wheel speed sensors 5–8.

Figure 1:
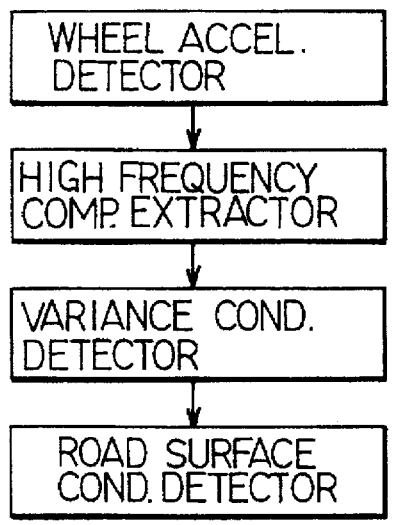
FIG. 1 is a block diagram of a road condition detector of the present invention.

Step 130 calculates wheel acceleration of each of the wheels 1–4 based on the wheel speeds calculated by step 120. Step 130 corresponds to a wheel acceleration detector shown in FIG. 1.

Step 140 performs a filtering procedure, which is explained later, for extracting high frequency components of the wheel accelerations of the wheels 1–4 calculated in step 130. Step 140 corresponds to a high frequency component extractor shown in FIG. 1.

As will be described in more detail later, step 150 performs a procedure for calculating variance of the wheel acceleration filtered by step 140. Step 150 corresponds to a variance condition detector shown in FIG. 1.

Step 160, as will be described later, determines a bad road based on the variance obtained in step 150. Step 160 corresponds to a road surface condition detector shown in FIG. 1.

Step 170, as will be described later, executes an anti-skid control procedure based on the result of the bad road determination carried out by step 160. After step 170, control goes back to step 120.

The filtering process of the wheel acceleration executed by step 140 is explained with reference to FIG. 5.

Using Eq. (1), step 140 executes a filtering process for extracting the high frequency components of the wheel acceleration calculated in step 130 according to Eq. (1).

$$DVWF(n)=A0*DVW(n)+A1*DVW(n-1)+A2*DVW(n-2)+B0*DVWF(n-1)+B1*DVWF(n-2) \quad (1)$$

It must be noted here that in Eq. (1), DVW(n) is the wheel acceleration before filtering at calculation (n), DVWF(n) is the wheel acceleration after filtering at calculation n and A0, A1, A2, B0, B1 are filter coefficients.

The filter coefficients A0, A1, A2, B0, B1 are set so that Eq. (1) becomes a high-pass filter for extracting only the predetermined high frequency components. More concretely, the filter coefficients A0, A1, A2, B0, B1 are set to distinguish frequencies related to bad road surfaces such as off-road surfaces from control fluctuation frequencies due to vehicle deceleration and anti-skid control and the like, and to allow passage of only those frequency components having frequencies greater than, for example, 20–30 Hz. A value of DVWF(n) obtained through the filtering process is set as the filtered wheel acceleration DVWF.

Figure 5A:
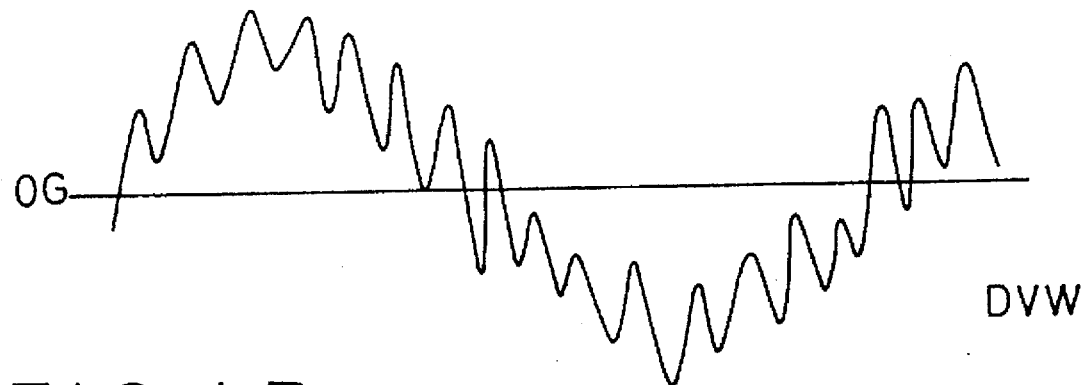
FIGS. 5A and 5B are graphs of a wheel acceleration signal before and after filtering in the first embodiment.
Figure 5B:
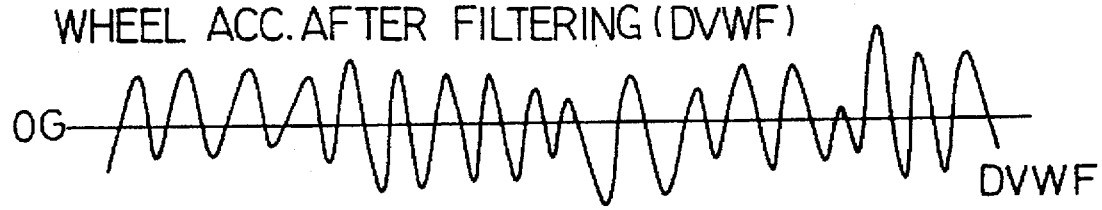

FIGS. 5A and 5B show the results of the filtering using a high-pass filter.

As shown in FIGS. 5A and 5B, while the wheel acceleration DVW before filtering vibrates largely due to the vehicle deceleration and control fluctuation, the filtered wheel acceleration DVWF obtained after filtering wheel acceleration DVW through the high-pass filter has its vibrating components extracted, thus leaving only the high frequency components which are related to the road surface condition.

Next, the process of calculating the variance of the filtered wheel acceleration performed in step 150 is explained hereinafter with reference to FIGS. 6 and 7.

Figure 6:
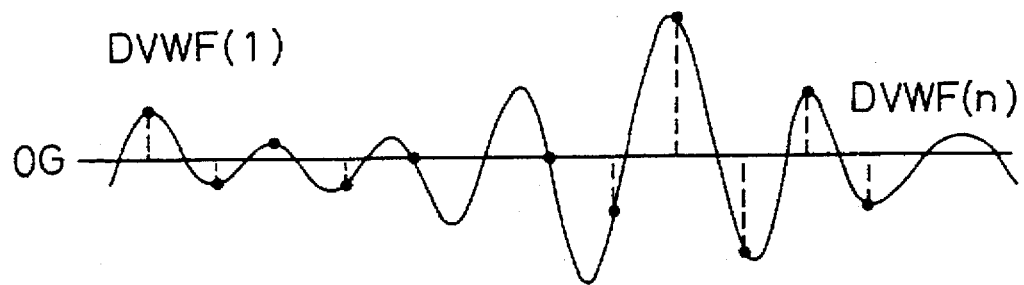
FIG. 6 is a graph showing a computation of the variance according to the first embodiment.
Figure 7:
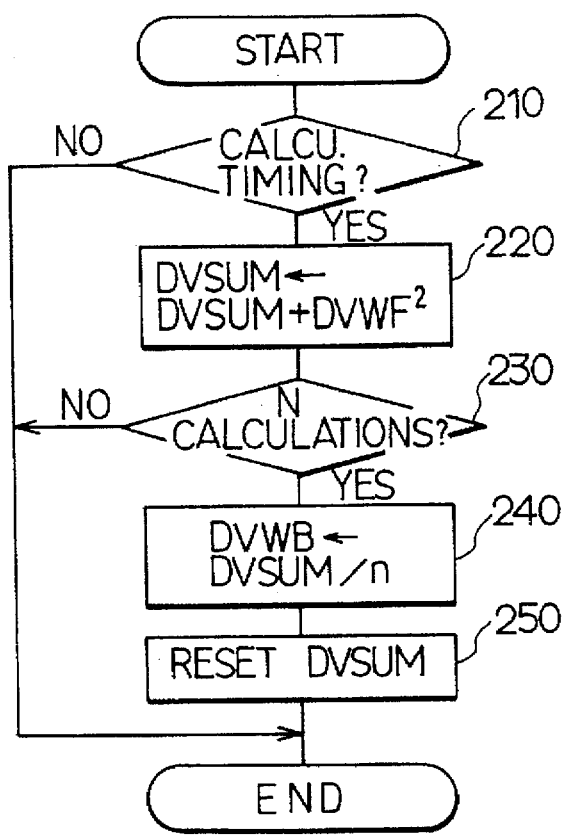
FIG. 7 is a flowchart of a variance computation procedure according to the first embodiment.

As shown in FIG. 6 and in the following Eq. (2), the variance DVWB of the filtered wheel acceleration DVWF is calculated by summing up the squares of the values of the filtered wheel acceleration DVWF and dividing the sum of the values by the number of samples (number of calculations) n. The variance DVWB shows a variance condition of the filtered wheel acceleration DVWF. For example, a large variance DVWB means that the wheel acceleration is widely dispersed.

$$DVWB=\{DVWF(1)^2+\ldots+DVWF(n)^2\}/n \quad (2)$$

Based on Eq. (2), the variance DVWB is calculated in the following flowchart of FIG. 7.

Step 210 determines whether a predetermined calculation timing period (for example, 5 ms) has elapsed since the last calculation or not. If step 210 gives a positive output, control goes to step 220. On the other hand, if step 210 gives a negative output, the present procedure terminates.

Step 220 adds the value of the square of the filtered wheel acceleration DVWF calculated in step 140 to a variance summation value DVSUM.

Step 230 determines if n calculations have been performed. If step 230 gives a positive output, control goes to step 240. On the other hand, if step 230 gives a negative output, the present process terminates.

Step 240 computes the variance DVWB by dividing the variance summation value DVSUM by n, and step 250 resets the variance summation value DVSUM and thus, the present process terminates.

Figure 8:
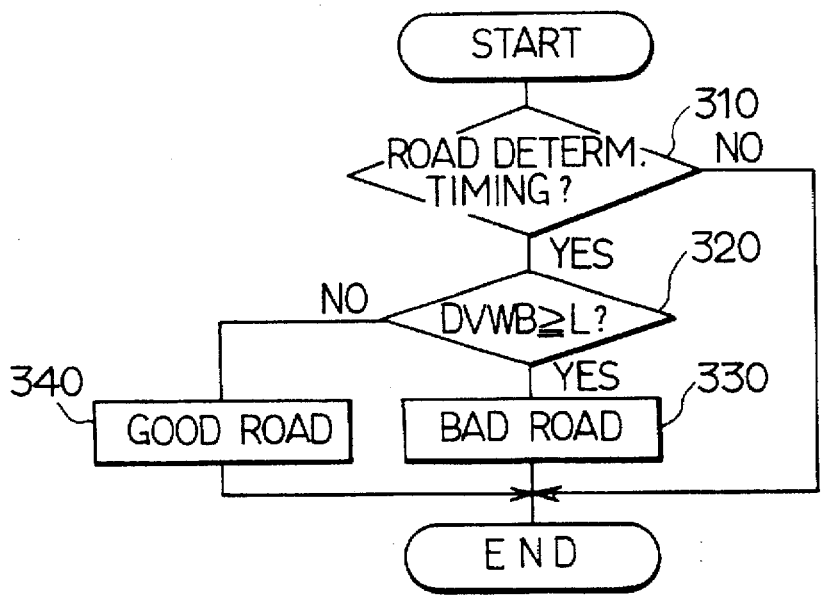
FIG. 8 is a flowchart of a bad road determination procedure according to the first embodiment.

Next, the bad road determination process executed by step 160 is explained with reference to the flowchart of FIG. 8.

Step 310 determines if a predetermined bad road determination timing (for example, 50 ms) has elapsed since the last bad road determination or not. If step 310 gives a positive output, control goes to step 320. Otherwise, the present process terminates.

Step 320 determines if the variance DVWB calculated in step 150 is no less than a predetermined bad road determination level L or not. That is, step 320 determines whether the high frequency components of the wheel acceleration are widely dispersed or not. If step 320 gives a positive output, control goes to step 330. Otherwise, control goes to step 340.

If the variance DVWB is large and the high frequency components of the wheel acceleration are widely dispersed, step 330 determines that road condition is bad and sets a flag AK which indicates a bad road condition and then, the present process terminates.

On the other hand, if the high frequency components of the wheel acceleration are not widely dispersed, step 340 determines that road condition is good and resets the flag AK and the present process terminates.

Next, the anti-skid control carried out in step 170 based on the result of the bad road determination of step 160 is explained in more detail with reference to FIGS. 9–12.

In this anti-skid process, when road condition is bad, the brake hydraulic pressure is increased to shorten the braking distance because the braking force of the vehicle increases when brake hydraulic pressure is increased. On the other hand, when the road condition is good, the brake hydraulic pressure is decreased. In this way, brake performance on bad roads is improved.

Figure 9:
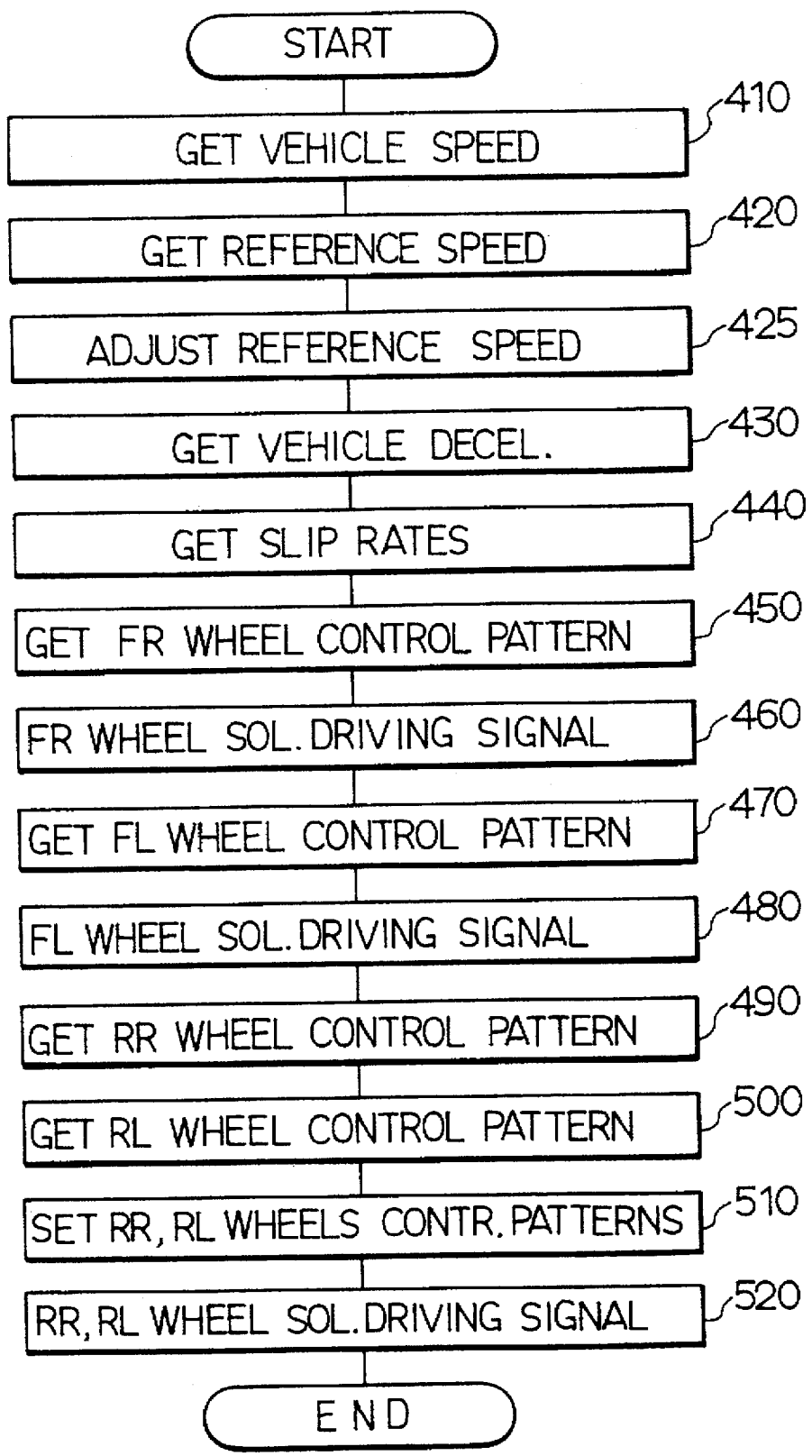
FIG. 9 is a flowchart of an anti-skid control procedure according to the first embodiment.

Step 410 of FIG. 9 calculates vehicle speed Vb based on the wheel speeds calculated in step 120. Setting a maximum speed among the wheel speeds of the wheels 1–4 as Vs, vehicle speed Vb is calculated based on the following Eq. (3).

$$Vb(n)=\text{MED}\{Vb(n-1)-\text{Kdown}\cdot\Delta T, Vs(n), Vb(n-1)+\text{Kup}*\cdot\Delta T\} \quad (3)$$

It must be noted here that in Eq. (3) Vb(n) is vehicle speed at calculation n, FEED is a median value function, Kdown is a wheel deceleration lower limit constant, $\Delta T$ is a calculation period, Vs(n) is the maximum wheel speed at time n, Kup is a wheel deceleration upper limit constant and n is the number of calculations.

It must be noted here that when calculating vehicle speed Vb, Kdown is set, for example, to 1.2 G (G is the constant of gravitational acceleration) while Kup is set, for example, to 0.6 G.

Figure 10:
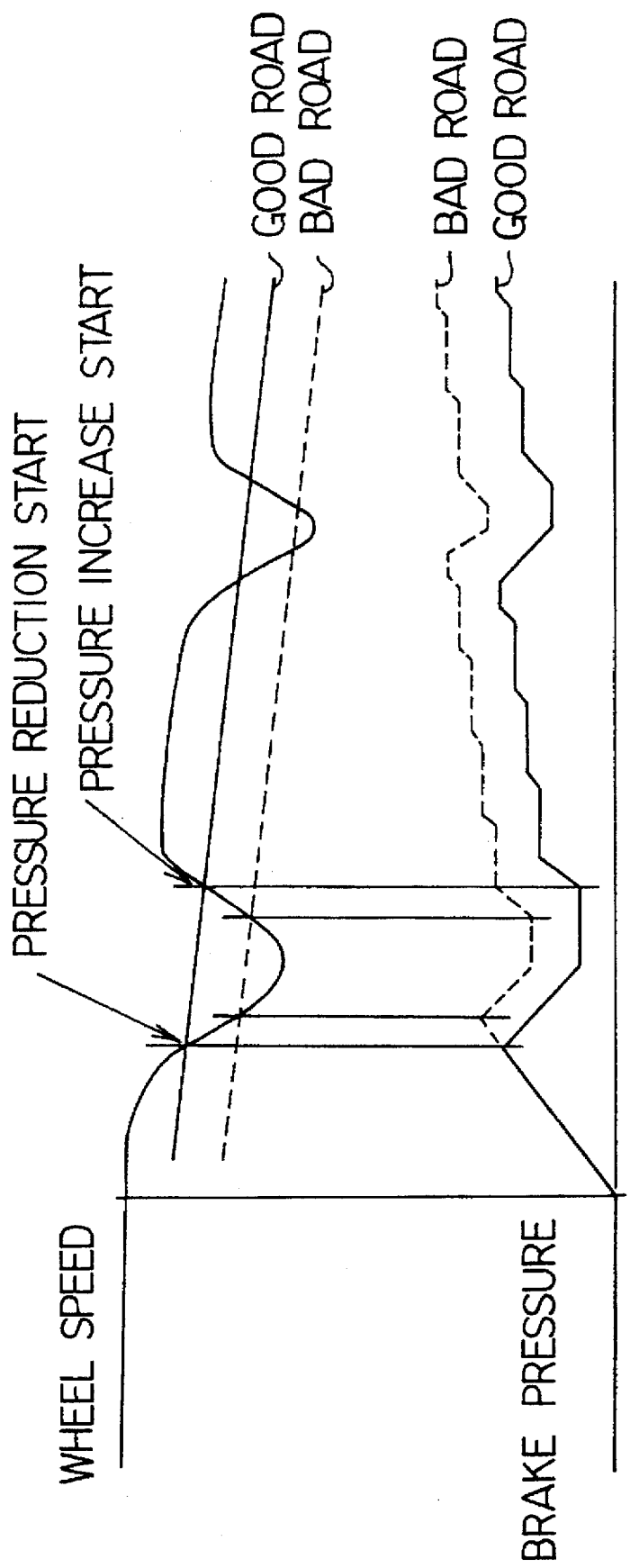
FIG. 10 is a graph showing change of a control reference in the first embodiment.

Step 420 calculates a reference vehicle speed kVb by reducing the vehicle speed Vb obtained in step 410 by a predetermined percentage. As shown in FIG. 10, the reference vehicle speed kVb is a reference speed used for switching the control condition of the brake hydraulic pressure when the wheel speed changes due to anti-skid control.

Step 425 changes the reference vehicle speed kVb (also referred to as control reference) obtained in step 420 in accordance with the result of the bad road determination of step 160.

To put it more concretely, when it is determined that the present road is a bad road, the control reference is set to a value lower than the control reference of a good road and thus, the timing for starting the reduction of brake hydraulic pressure for a bad road is delayed. Therefore, as shown in FIG. 10, brake hydraulic pressure increases and brake performance on the bad road is improved.

Step 430 calculates a vehicle deceleration $\delta Vb$ using Eq. (5) based on the vehicle speed calculated in step 410. To obtain $\delta Vb$, first, an amount of change in the vehicle speed Vb within a time interval $\delta t$ is calculated as an average vehicle deceleration $\delta Vbx$ using the following Eq. (4). Using the average vehicle deceleration $\delta Vbx$, a controlled amount of change from the previous value of the average vehicle deceleration is obtained as the estimated vehicle deceleration $\delta Vb$.

$$\delta Vbx(n)=[Vb(n-1)-Vb(n)]/\delta t \quad (4)$$

It must be noted here that in Eq. (4), $\delta Vbx(n)$ is average vehicle deceleration at calculation n, $\delta t$ is the calculation period and n is the number of calculations.

$$\delta Vb(n)=\text{MED}(\delta Vb(n-1)-\text{Kpdown}\cdot oT, \delta Vbx(n), \delta Vb(n-1)+\text{Kpup}\cdot\Delta T)-\text{KGH} \quad (5)$$

It must be noted here that in Eq. (5), $\delta Vb(n)$ is the estimated vehicle deceleration at calculation n, MED is a median value function, Kpdown is a deceleration change lower limit variable, $\Delta T$ is the period of calculation, $\delta Vbx(n)$ is the average vehicle deceleration at calculation n, Kpup is a deceleration change upper limit variable, n is the number of calculations and KGH is a compensation variable.

It must be noted here that when the average vehicle deceleration $\delta Vbx$, which is the calculated value of Eq. (4), is less than 0, the present calculated value is not used, and instead, the average vehicle deceleration $\delta Vbx$ calculated before is used. The deceleration change lower limit variable Kdown, deceleration change upper limit variable Kpup and compensation variable KGH are determined based on a solenoid driving control pattern of each of the wheels 1–4 and the wheel slip rates calculated and determined in steps 440, 450, 470, 490 and 500 described later.

Step 440 calculates the slip rates of wheels 1–4 based on the wheel speed of each of the wheels 1–4 and the vehicle speed obtained in steps 120 and 410, respectively. Known methods can be used for the calculating the slip rate.

Step 450 determines the solenoid driving control pattern of the front right wheel 1. Based on the wheel acceleration and the wheel slip rate calculated in steps 130 and 440, the driving control pattern is determined following the flowchart of FIG. 11 described later and is one of the patterns shown in FIG. 12.

Step 460 generates a driving signal for driving the solenoid valves of the actuator 21 of the front right wheel 1 based on the control pattern of the same wheel 1 determined in step 450.

In the same way, step 470 determines the solenoid driving control pattern of the front left wheel 2. Step 480 generates the driving signals for driving the solenoid valves of the actuator 22 based on the solenoid driving control pattern.

Next, steps 490 and 500 determine the solenoid driving patterns of the rear right and left wheels 3, 4.

Step 510 sets the control patterns of the rear right and left wheels 3, 4 to a low select control. Step 520 generates driving signals for driving the actuators 23, 24 of the rear right and left wheels 3, 4.

Next, the method for determining the solenoid driving patterns of each of the wheels 1–4 in steps 450, 470, 490 and 500 is explained in more detail with reference to FIG. 11. Explanations shall be made hereinafter with reference to a vehicle wheel which refers any one of the wheels 1–4.

It must be noted here that the solenoid driving pattern determined hereinafter also determines the conditions for changing the variables used in calculating the estimated vehicle deceleration $\delta Vb$ in step 430 which are, namely, the deceleration change lower limit variable Kpdown, the deceleration change upper limit variable Kpup and the compensation variable KGH.

Figure 11:
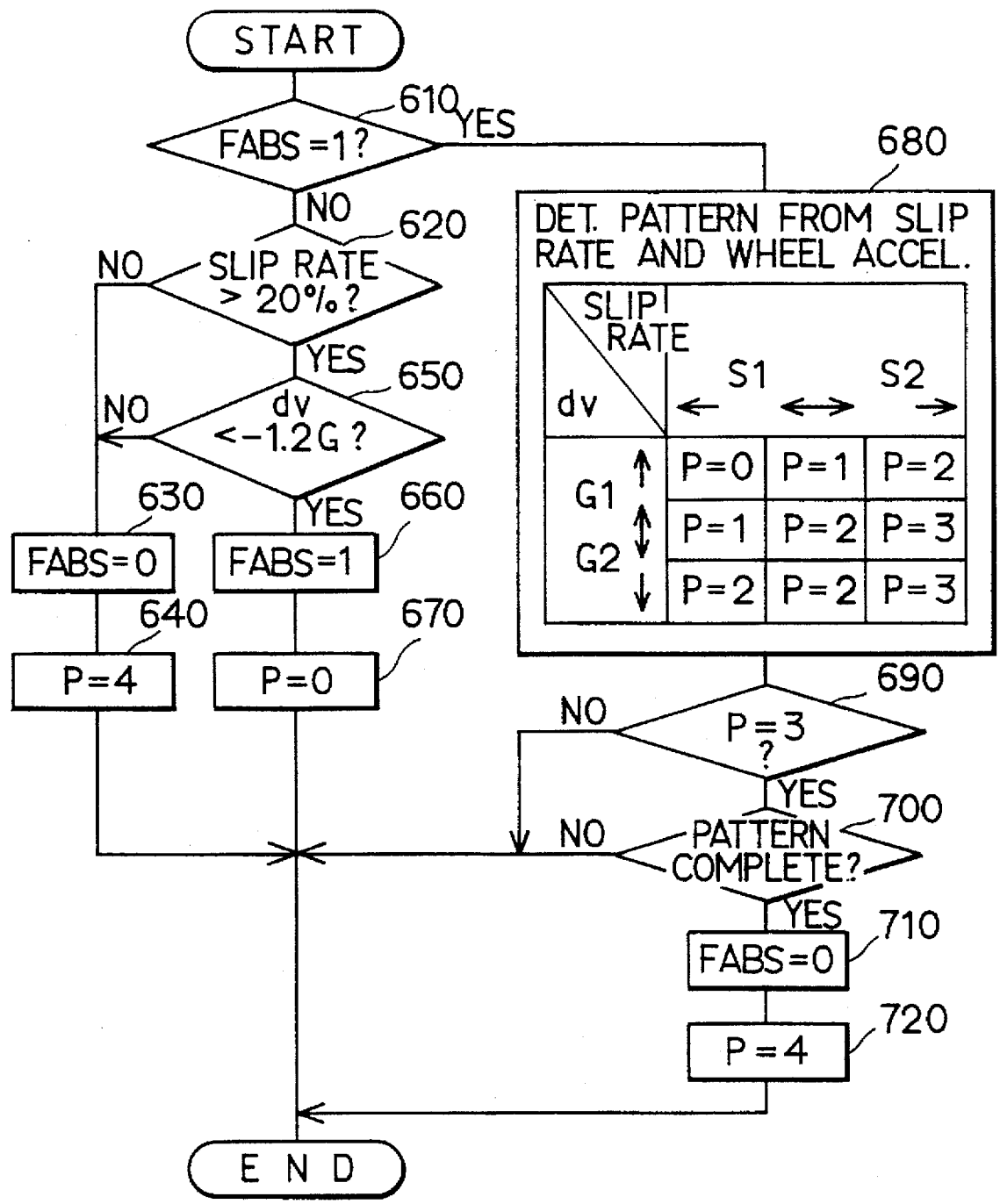
FIG. 11 is a flowchart of a solenoid driving pattern determination procedure according to the first embodiment.

First, step 610 of FIG. 11 determines if flag FABS, which indicates if anti-skid control is being performed or not, is set. If the flag FABS is not set, it indicates that anti-skid control has not yet been started, and control goes to step 620.

In order to determine the brake condition of the vehicle, step 620 compares a predetermined value of the slip rate (for example, 20%) with the present slip rate. When the solenoid driving control pattern of each of the wheels 1–4 is to be determined, the slip rate calculated in step 440 is used as the present slip rate. When the present slip rate is no larger than the predetermined value, control goes to step 630.

Because the slip rate of the vehicle wheel is no greater than the predetermined value and a friction contact condition between the wheel and the road surface is determined to be not bad, step 630 determines that there is no need to start anti-skid control and so, flag FABS is reset to indicate that anti-skid control is not being performed and control goes to step 640.

With FABS=0, step 640 sets the solenoid driving control pattern of the vehicle wheel to P=4 which is described later in FIG. 12.

Meanwhile, if step 620 determines that the present slip rate is larger than the predetermined value, anti-skid control may be started, and so, control goes to step 650.

Step 650 determines whether the present vehicle wheel acceleration is no greater than a predetermined value (which is, for example, −1.2 G in the present embodiment). It must be noted here that when determining the solenoid driving control pattern of the vehicle wheel, the wheel acceleration calculated in step 130 is set as the present wheel acceleration. When the deceleration of each of the vehicle wheels is determined to be larger than the predetermined value, control goes to step 660. When the deceleration of the vehicle wheel is determined to be less than the predetermined value, the vehicle wheel has a certain amount of slip. However, if the deceleration of the vehicle wheel is not very large, the friction contact between the vehicle wheel and the road surface is determined to be good and so, control goes to step 630.

If the slip rate of the vehicle wheel is larger than the predetermined value and the deceleration of the vehicle wheel is larger than a predetermined value, step 660 sets flag FABS because there is a need to start anti-skid control to address the bad friction contact condition between the vehicle wheel and the road surface.

Subsequent step 670 sets the solenoid driving control pattern of the vehicle wheel to P=0 which is described later with reference to FIG. 12.

Meanwhile, if step 610 determines that flag FABS is set and that anti-skid control is being performed, control goes to step 680.

Step 680 determines the solenoid driving control pattern of the vehicle wheel based on the present slip rate of the vehicle wheel and the wheel acceleration. The present slip rate is the same slip rate used in step 620 and the present wheel acceleration is the same wheel acceleration used in step 650. The solenoid driving control pattern of each of the wheels 1–4 is determined based on the slip rate, the wheel acceleration and a map shown in step 680. It must be noted here that there is no need to be limited with the type of map shown in step 680, and other different maps may be used in accordance with the purpose of using the vehicle. Parameters S1 and S2 of the slip rate are set to 15% and 5%, respectively and the parameters G1 and G2 of the wheel acceleration are set to −1.0 G and +0.5 G, respectively.

Step 690 determines if the solenoid driving pattern of the vehicle wheel is a pattern P=3, which is described later with reference to FIG. 12, or not. When the solenoid driving pattern of the vehicle is determined to be not P=3, the actuator of the vehicle wheel is driven by generating solenoid driving signals based on the solenoid driving pattern determined in step 680.

On the other hand, when step 690 determines that the solenoid driving pattern of the vehicle wheel is P=3, then control goes to step 700.

Step 700 determines if an output pattern (described later) of the pattern P=3 is complete or not. If step 700 determines that the output pattern is not yet complete, the present process terminates. On the other hand, if step 700 determines that the output pattern has been completed, control goes to step 710.

With the completion of the output pattern of the pattern P=3, it is assumed that the friction contact condition between the vehicle wheel and the road surface has improved and that anti-skid control has been ended and so, step 710 resets the flag FABS.

With the flag FABS reset, a subsequent step 720 sets the control pattern of the wheel to P=4, which is described later with reference to FIG. 12.

Next, the solenoid driving control pattern determined in steps 680 and the like are explained with reference to FIG. 12. It must be noted here that pattern P indicates the driving signals for driving the actuators 21–24.

As shown in FIG. 12, the solenoid driving pattern P is set to P=0 in step 670 and in step 680 when the wheel deceleration and the slipping rate are both large. That is, the solenoid driving pattern P=0 improves the contact condition between the vehicle wheel and the road surface by generating a signal for continuously decreasing the brake hydraulic pressure applied on the wheel cylinder when the contact condition deteriorates because of the excess brake hydraulic pressure exerted on the wheel cylinder.

The solenoid driving control pattern P=1 is set when the contact condition between the vehicle wheel and the road surface is not good but yet not bad enough as determined from the relationship between the slip rate and wheel deceleration on the map in step 680 to necessitate continuous pressure reduction. That is, this solenoid driving pattern is for gradually improving the contact condition between the vehicle wheel and the road surface by continuously and alternately generating at a predetermined time period a brake hydraulic pressure maintain signal for maintaining the brake hydraulic pressure exerted on the wheel cylinder and a brake hydraulic pressure reduction signal for reducing the brake hydraulic pressure.

Based on the map shown in step 680, the solenoid driving pattern P is set to P=2 when the slip rate is large and the wheel speed is on the increase with increasing wheel acceleration, and when the wheel deceleration is large and the slip rate is small, and when a relation between the slip rate and the vehicle acceleration is in between the above-described two cases. The solenoid driving control pattern P=2 generates the brake hydraulic pressure maintain signal for maintaining the brake hydraulic pressure exerted on the wheel cylinder.

The solenoid driving control pattern P=3 is set when the slip rate and the wheel acceleration are equal to or less than the predetermined values and anti-skid control is being executed. The solenoid driving control pattern P=3 generates the brake hydraulic pressure maintain signals and the brake hydraulic pressure increase signals repeatedly at a predetermined time period. The number of pulses can be set beforehand. For example, the number of pulses may be set to 10 pulses. When controlling hydraulic pressure by repeating this solenoid driving pattern, it must be noted here that the number of pulses is set such that the brake hydraulic pressures in the wheel cylinders 11–14 are the same as the hydraulic pressure from the master cylinder 16.

The solenoid driving control pattern P=4 is set in steps 640 and 720 when anti-skid control is not being carried out. The solenoid driving control pattern P=4 is for increasing the brake forces of each of the wheels 1–4 by generating signals for continuously increasing the brake hydraulic pressure exerted on the wheel cylinder.

As described before, the present embodiment performs a bad road determination by extracting the high frequency components (which indicate road surface condition) of the signals from the wheel speed sensors 5–8 of the wheels 1–4 by high-pass filtering, computing the variance of the high frequency components and comparing the variance of the high frequency components with the bad road determination level. That is, bad road determination can be carried out more precisely because the road surface condition is detected based on high frequency components, which more accurately indicate the road surface condition after the vehicle deceleration components and control fluctuation components are removed from the signals of the wheel speed sensors 5–8.

Therefore, since anti-skid control is carried out based on the accurate result of the bad road determination, the anti-skid control on both bad roads and good roads can be performed well, thus significantly improving brake performance.

It must be noted here that while brake hydraulic pressure is increased when a bad road is detected by changing the control reference and delaying the pressure reduction timing, the brake hydraulic pressure can also be increased using other control procedures. For example, the pulse sizes of the pressure reduction and pressure increase pulses shown in FIG. 12 can be adjusted so that the brake hydraulic pressure is controlled to the pressure increase side (as compared to the case for good roads). Furthermore, during the determination of the solenoid driving control pattern in step 680, the reference values S1, S2, G1 and G2 can be set such that brake hydraulic pressure is in the pressure increase side (as compared to the case for good roads).

Moreover, the estimated vehicle deceleration δVb calculated in step 430 may be made to reflect the reference values S1, S2, G1 and G2 so that a more accurate anti-skid control can be carried out.

Further, as disclosed in Japanese Patent Laid-Open Publication No. Hei 7-43134, the change limit parameters for controlling the rate of change of the estimated vehicle deceleration δVb, that is, the deceleration change lower limit variable Kdown, the deceleration change upper limit variable Kpup and the revision variable KGH may be set using the solenoid driving control patterns of the wheels 1–4.

Next, the road surface condition detector of a second embodiment is explained hereinafter.

The road surface condition detector of the second embodiment adjusts the filter coefficient and the bad road determination level in accordance with the wheel speed and the anti-skid control condition. It must be noted here that in the present embodiment, explanations of parts, units and the like that are the same as that of the first embodiment have been either omitted or simplified.

Figure 13:
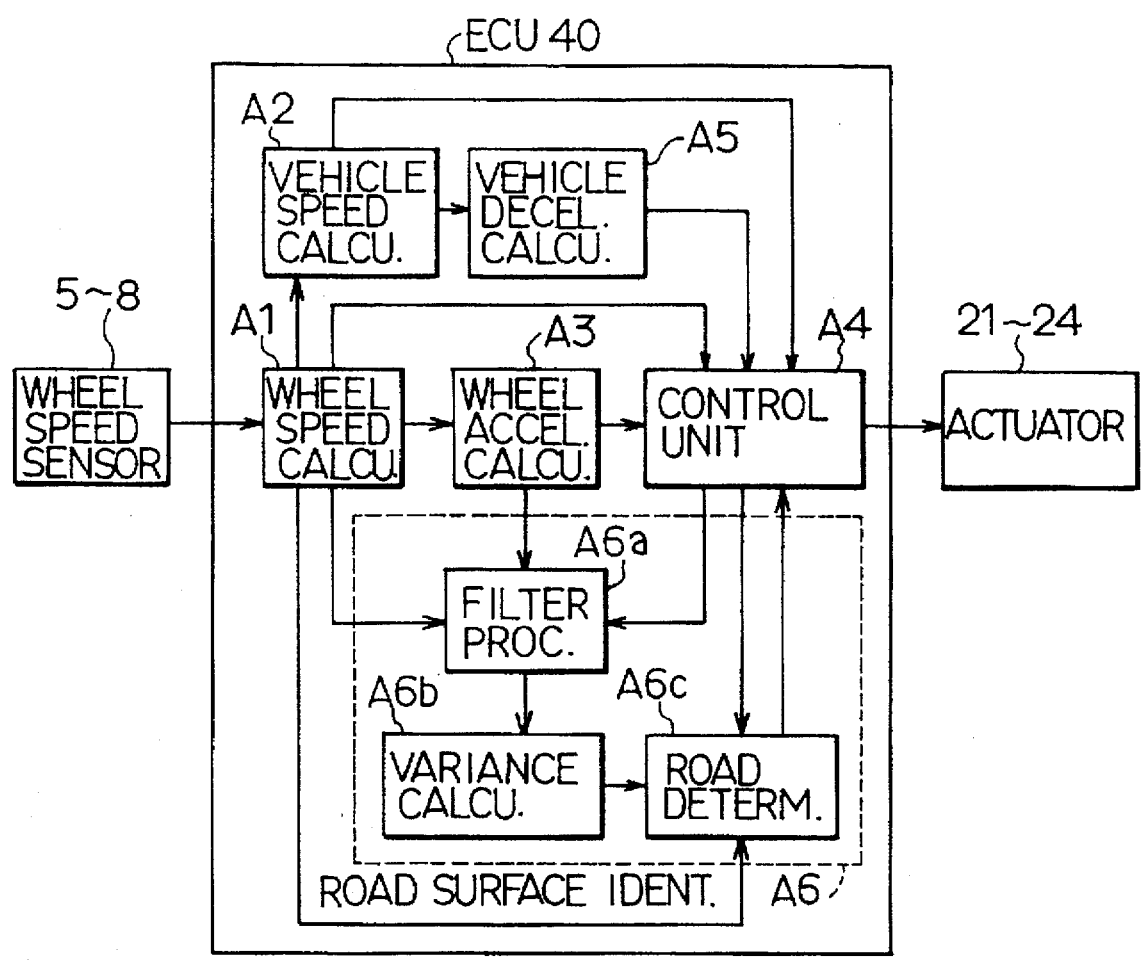
FIG. 13 is a block diagram of a road condition detector according to a second embodiment of the present invention.

The flow of control in the second embodiment is explained briefly with reference to FIG. 13.

Except for the data transmission paths, constructions of the wheel speed calculation unit A1, the vehicle speed calculation unit A2, the wheel acceleration calculation unit A3, the control unit A4, the estimated vehicle deceleration calculation unit A5, road surface identifier A6, the filter processor A6a, the variance calculation unit A6b and the bad road determination unit A6c are the same as that of the first embodiment.

As mentioned above, the present embodiment has data transmission paths different from those of the first embodiment. That is, the wheel Speed data from the wheel speed calculation unit A1 is also provided to the filter processor A6a and the bad road determination unit A6c. Data on whether anti-skid control is being executed or not is provided to the filter processor A6a and the bad road determination unit A6c by the control unit A4.

Figure 14:
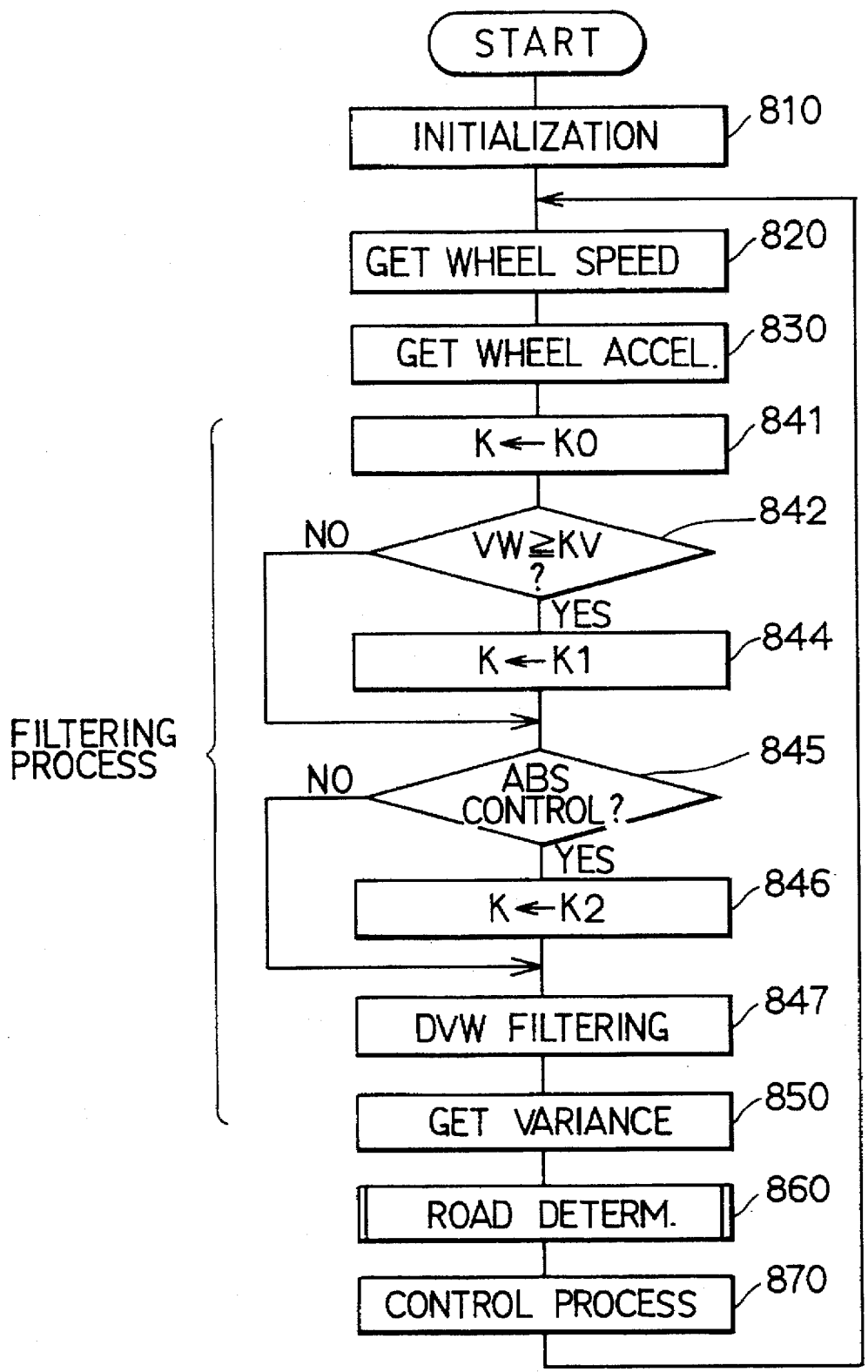
FIG. 14 is a flowchart of a main routine of the second embodiment.

Next, the anti-skid control process according to this second embodiment is explained with reference to the flowchart of FIG. 14. The execution of this process starts when the ignition switch 41 is actuated.

Step 810 initializes the various types of flags and counters.

A subsequent step 820 computes wheel speed VW of each of the wheels 1–4 based on the wheel speed signals from the wheel speed sensors 5–8.

Step 830 computes wheel acceleration DVW of each of the wheels 1–4 from the wheel speed VW calculated in step 820.

As will be described in detail below, steps 841–847 perform a filtering process for extracting high frequency components of the wheel speed signals of the wheels 1–4 computed in step 830.

First, step 841 sets the filter coefficient K is set to a normal filter coefficient value K0. It must be noted here that there is a constant predetermined relationship between filter coefficient K and filter coefficients A0, A1, A2, B0 and B1 in Eq. (1). That is, when the filter coefficient K is changed, the filter coefficients A0, A1, A2, B0 and B1 change in accordance with such change in the filter coefficient K.

Step 842 determines whether the wheel speed VW is greater than or equal to the reference value KV or not, that is, step 842 determines whether the wheel speed VW is large or not. When step 842 gives a positive output, control goes to step 844. On the other hand, control goes to step 845 when step 842 gives a negative output.

If the vehicle speed VW is large, step 844 sets filter coefficient K to a value K1 with K1>K0. That is, when the wheel speed VW is large, since noise components (for example, noise components due to sensor installation condition) which do not indicate the road surface condition in the data of the wheel acceleration DVW tend to be larger, the value of the filter coefficient K is changed in order to remove such noise components.

Step 845 determines if anti-skid control (ABS control) is being performed or not. If step 845 gives a positive output, control goes to step 846. Otherwise, control goes to step 847.

When anti-skid control is being performed, step 846 sets the filter coefficient K to a value K2 with K2>K0. That is, when the anti-skid control is being executed, the control fluctuation components in the wheel acceleration DVW are increased and so, the value of the filter coefficient K is changed in order to remove such components.

Step 847 determines Eq. (1) by setting the filter coefficients A0, A1, A2, B0 and B1 in accordance with the filter coefficient K which is set in accordance with the wheel speed VW and the anti-skid control conditions. By using Eq. (1), the filtering process of the wheel acceleration DVW is carried out in the same way as that of step 140 of the first embodiment.

Step 850 performs the process of calculating the variance DVWB of the filtered wheel acceleration DVW similar to that of step 150 of the first embodiment.

Figure 15:
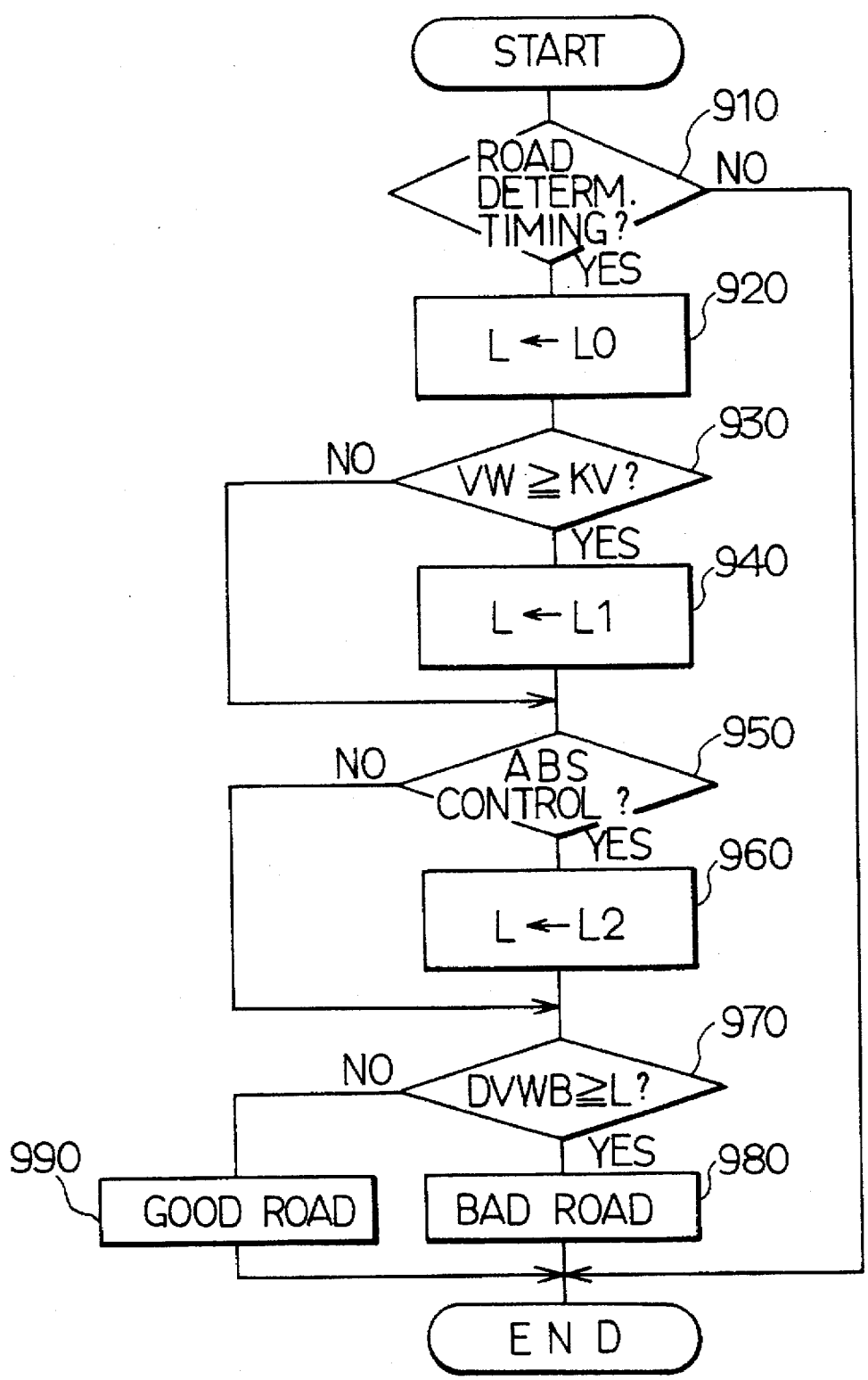
FIG. 15 is a flowchart of a bad road determination procedure of the second embodiment.

As will be described in detail later in FIG. 15, step 850 performs the bad road determination based on the variance DVWB.

Step 870 performs the anti-skid control similar to that of step 170 of the first embodiment based on the result of the bad road determination carried out in step 860 and control goes back to step 820.

Next, the process of the bad road determination executed by step 860 is explained with reference to the flowchart of FIG. 15.

Step 910 determines if the timing is the predetermined road determination timing or not. If step 910 gives a positive output, control goes to step 920. Otherwise, if step 910 gives a negative output, the present process terminates.

Step 920 sets the bad road determination level L to a normal determination value L0.

A subsequent step 930 determines if the wheel speed VW is greater than or equal to the reference value KV or not. If step 930 gives a positive output, control goes to step 940. On the other hand, if step 930 gives a negative output, control goes to step 950.

When vehicle speed VW is large, step 940 sets bad road determination level L to a value L1 with L1>L0. That is, when the wheel speed VW is large, since noise components (for example, noise components due to sensor installation condition) which do not indicate the road surface condition in the data of the variance DVWB tend to be larger, the value of the road determination level L is changed in order to remove such noise components.

Step 950 determines if anti-skid control (ABS control) is being performed or not. If step 950 gives a positive output, control goes to step 960. Otherwise, control goes to step 970.

Because anti-skid control is being performed, step 960 sets the road determination level to a value L2 with L2>L0. That is, when the anti-skid control is being executed, the control fluctuation components in the variance DVWB are increased and so, the value of the road determination level L is changed in order to remove such components.

Step 970 determines whether or not the variance DVWB calculated in step 850 is no less than the bad road determination level L set in accordance with the wheel speed VW and the anti-skid control conditions. That is, step 970 determines if the high frequency components of the wheel acceleration DVW are largely dispersed or not. When step 970 gives a positive output, control goes to step 980; otherwise, control goes to step 990.

Step 980 sets the flag AK since the road is assumed to be a bad road because the high frequency components of the wheel acceleration DVW are greatly dispersed. The execution of the present process terminates after step 980.

Step 990 resets the flag AK since the road is assumed to be a good road because the high frequency components of the wheel acceleration DVW are not dispersed so much. The execution of the process terminates after step 990.

In this way, in the second embodiment, since the bad road determination is carried out by changing the filter coefficient K and the bad road determination level L in accordance with the wheel speed VW and the anti-skid control condition, bad road determination can be carried out more accurately than in the first embodiment. Therefore, the anti-skid control can be executed more properly.

Next, the road surface condition detector of a third embodiment is explained hereinafter.

The road surface condition detector of the third embodiment calculates a differential of the variance. It must be noted here that explanations of parts, steps and the like similar to the previous embodiments are either omitted or simplified in the present embodiment.

Figure 16:
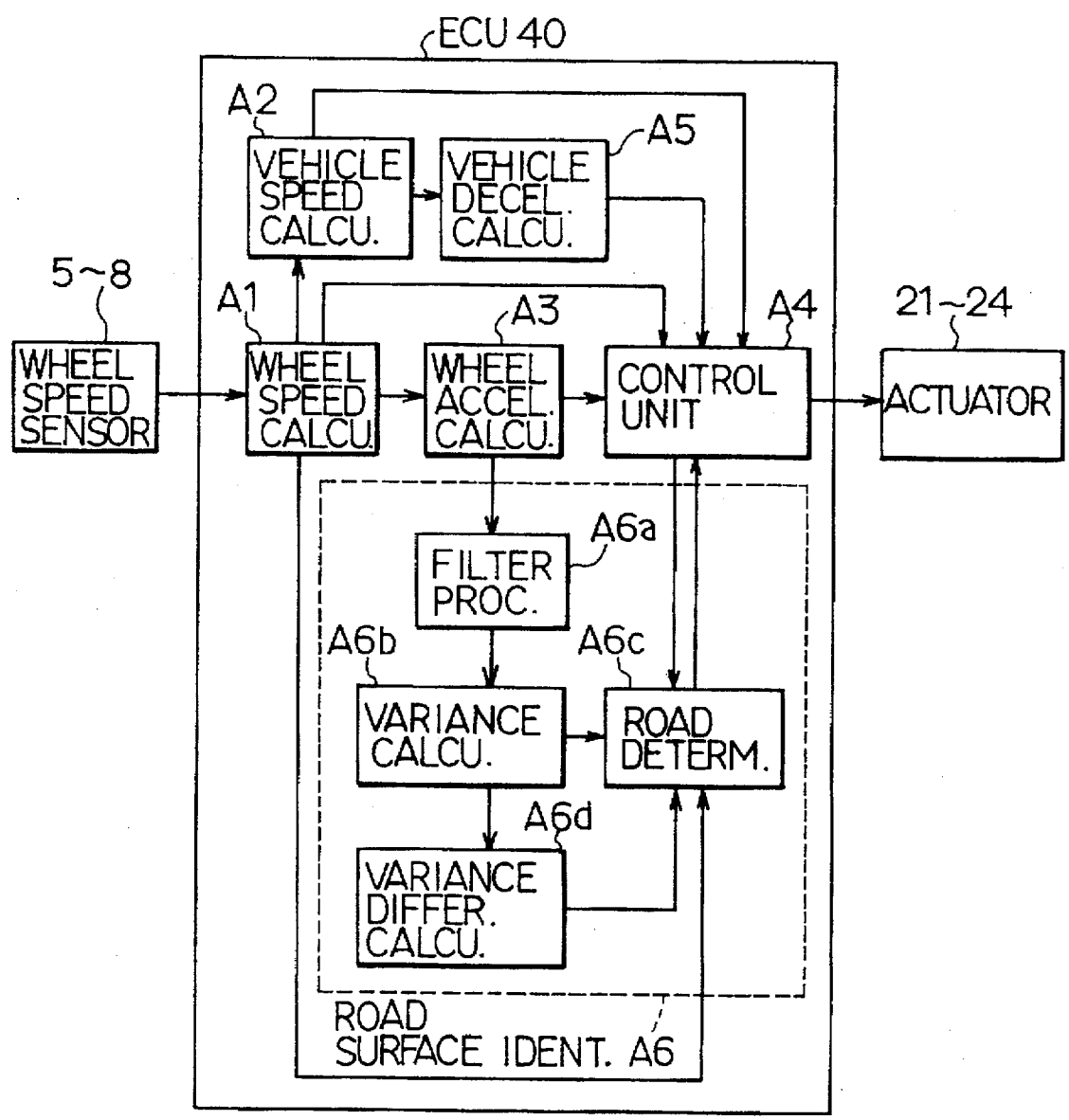
FIG. 16 is a block diagram of a road condition detector according to a third embodiment of the present invention.

The flow of control in the third embodiment is explained with reference to the block diagram of FIG. 16.

The constructions of the wheel speed calculation unit A1, the vehicle speed calculation unit A2, the wheel acceleration calculation unit A3, the control unit A4, the estimated vehicle deceleration calculation unit A5, the road surface identifier A6, the filter processor A6a, the variance calculation unit A6b and the bad road determination unit A6c are the same as that of the first embodiment. However, a differential value calculation unit A6d and a different data transmission path is provided for the present embodiment.

That is, the variance calculated by the variance calculation unit A6b is provided to the differential value calculation processor unit A6d and a differential value of the variance calculated by the differential value calculation processor unit A6d is provided to the bad road determination unit A6c. The wheel speed calculated by the wheel speed calculation unit A1 is provided to the bad road determination unit A6c. Furthermore, data on whether anti-skid control is being performed or not is provided by the control unit A4 to the bad road determination unit A6c.

Figure 17:
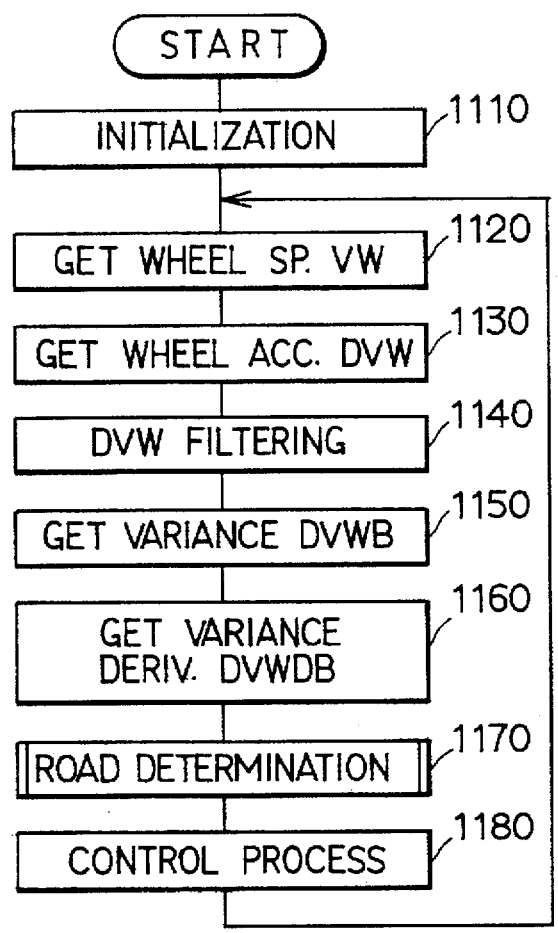
FIG. 17 is a flowchart of a main routine of the third embodiment.
Figure 19:
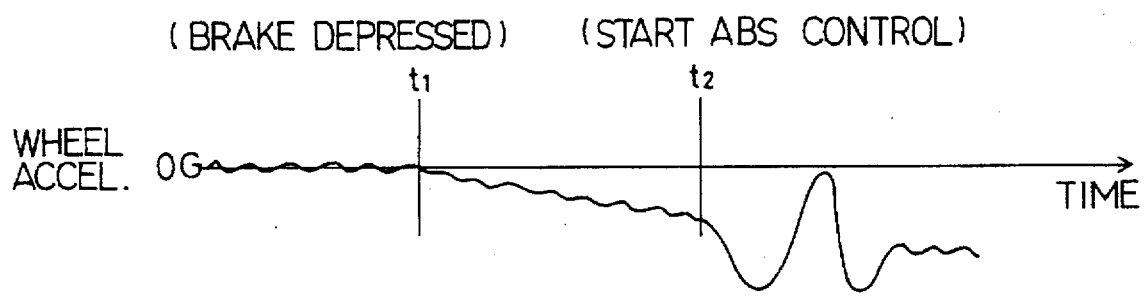
FIG. 19 is a graph of wheel acceleration according to the prior art.

Next, the anti-skid control process according to the third embodiment is explained with reference to the flowchart in FIG. 17. The execution of this control process starts when the ignition switch 41 is actuated.

Step 1110 initializes the various flags and counters.

Step 1120 computes the wheel speed VW of each of the wheels 1-4 based on the wheel speed signals from the wheel speed sensors 5-8.

Step 1130 calculates the wheel acceleration DVW of each of the wheels 1-4 based on the wheel speed VW calculated in step 1120.

In the same way as step 140, step 1140 performs a filtering process for extracting the high frequency components of the wheel acceleration of each of the wheels 1-4 calculated in step 1130. It must be noted here that a filtering process similar to that performed in steps 841-847 of the second embodiment is also carried out here.

In the same way as step 150, step 1150 calculates the variance DVWB of the wheel acceleration DVW filtered in step 1140.

Step 1160 computes a variance differential value DVWDB using the following Eq. (6).

$$DVWDB = \{DVWB(n) - DVWB(n-1)\}/T \quad (6)$$

It must be noted here that in Eq. (6) $DVWB(n-1)$ is the previous variance, $DVWB(n)$ is the present variance and T is the time interval between calculations.

Figure 18:
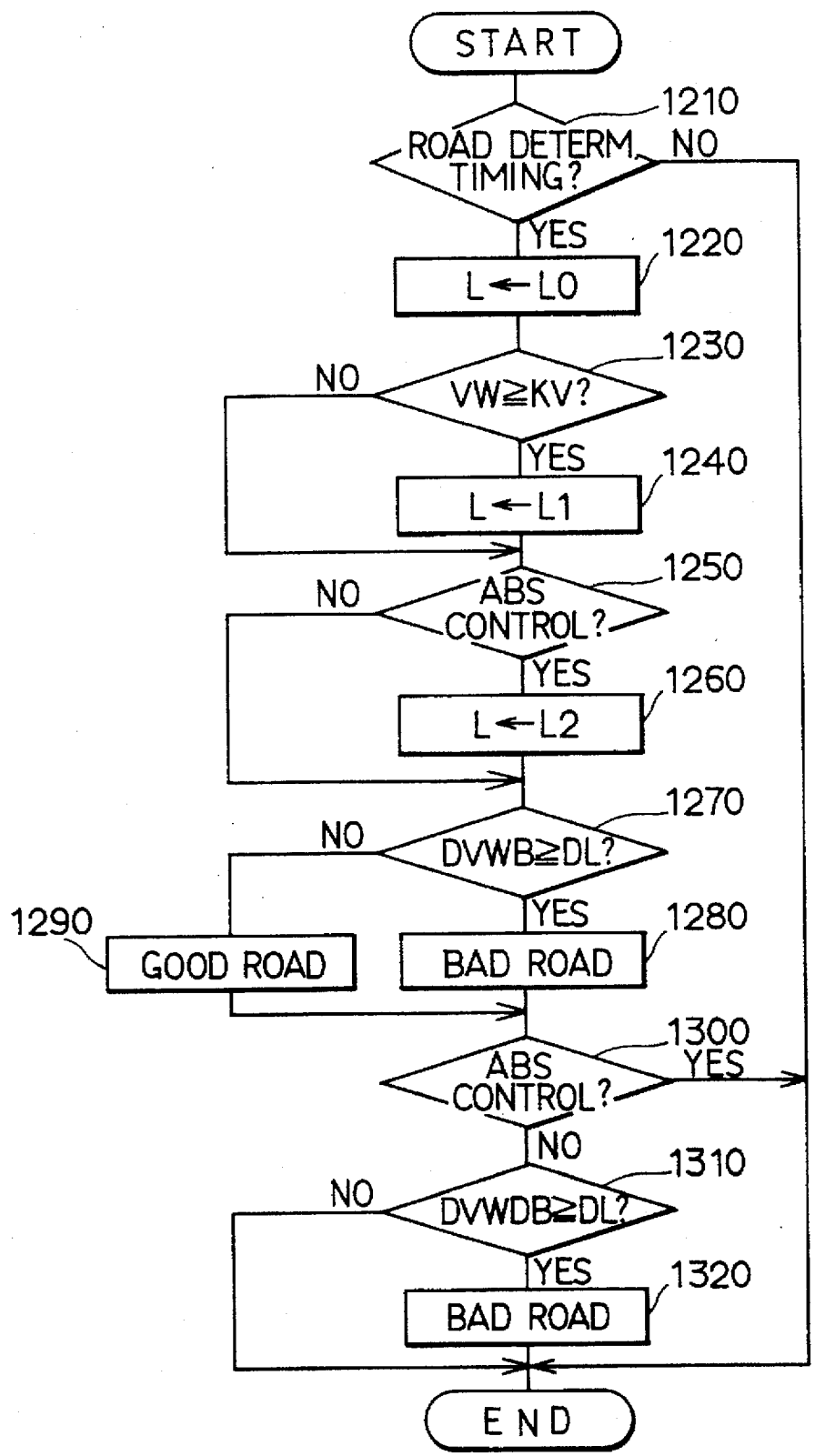
FIG. 18 is a flowchart of the bad road determination procedure of the third embodiment.

As will be described later with reference to FIG. 18, step 1170 performs the bad road determination by using the variance DVWB obtained in step 1150 and the variance differential value DVWDB obtained in step 1160.

In the same way as step 170 of the first embodiment, step 1180 executes the anti-skid control based on the result of the bad road determination of step 1170. After step 1180, control goes back to step 1120.

Next, the bad road determination executed by step 1170 is explained in more detail with reference to the flowchart of FIG. 18.

Step 1210 determines whether or not the timing is the predetermined bad road determination timing. If step 1210 gives a positive output, control goes to step 1220. On the other hand, the present process terminates when step 1210 gives a negative output.

Step 1220 sets the bad road determination level L to the normal determination value L0.

Step 1230 determines whether or not the wheel speed VW is greater than or equal to the reference value KV. If step 1230 gives a positive output, control goes to step 1240. On the other hand, control goes to step 1250 when step 1230 gives a negative output.

To correspond with a large value of the vehicle speed VW, step 1240 sets the bad road determination level L to the value L1 with L1>L0.

Step 1250 determines if anti-skid control is being executed or not. If step 1250 gives a positive output, control goes to step 1260. On the other hand, control goes to step 1270 when step 1250 gives a negative output.

Step 1260 sets the bad road determination level L to a value L2 with L2>L0 when anti-skid control is being executed.

Step 1270 determines whether or not the variance DVWB calculated in step 1150 is greater than or equal to the bad road determination level L set in accordance with the wheel speed VW and the anti-skid control conditions. That is, step 1270 determines whether or not the high frequency components of the wheel acceleration DVW are largely dispersed or not. If step 1270 gives a positive output, control goes to step 1280. On the other hand, control goes to step 1290 when step 1270 gives a negative output.

When the high frequency components of the wheel speed DVW are largely dispersed, the road is assumed to be a bad road and so, step 1280 sets flag AK which indicates bad roads.

On the other hand, when the high frequency components of the wheel DVW are not largely dispersed, step 1290 resets flag AK.

A subsequent step 1300 again determines whether anti-skid control is being performed or not. If step 1300 gives a positive output, the present process terminates. On the other hand, if step 1300 gives a negative output, control goes to step 1310. In short, because the variance differential value DVWDB is generally large when anti-skid control is being executed in the present process, it will be hard to determine the specific road surface variations and so, step 1310 and subsequent steps are bypassed.

Step 1310 determines whether the variance differential value DVWDB calculated in step 1160 is greater than or equal to the reference value DL or not. That is, for example, when the variance differential value DVWDB is large, it can be assumed that there is a single road surface variation such as a bump or the like and so, the road surface condition can be determined more accurately based the variance differential value DVWDB. When step 1310 gives a positive output, control goes to step 1320. On the other hand, the present process terminates when step 1310 gives a negative output.

Because a single road surface variation may also be considered as a bad road condition, step 1320 sets flag AK which indicates bad roads. It must be noted here that the flag AK remains set when step 280 has already determined the road as a bad road.

In this way, in this third embodiment, since the bad road determination is executed based on the variance DVWDB of the wheel acceleration DVW, not only is the bad road determination carried out accurately but moreover, because the bad road determination is carried out based on the variance differential value DVWDB, a single road surface variation can be detected. Thus, bad road determination can be carried out more precisely and so, anti-skid control can be carried out more appropriately.

Although the present invention has been fully described in connection with preferred embodiments thereof with reference to the accompanying drawings, it is to be noted that various changes and modifications will become apparent to those skilled in the art.

For example, the present invention can be applied to a suspension control system. A band-pass filter (for example, a filter passing frequencies in a range between 30 and 80 Hz) of the high frequency components in a predetermined range may be used aside from the high-pass filter. Further, necessary high frequency components can also be extracted using a low-pass filter.

Concretely, Eq. (1) can become an equation for the low-pass filter by appropriately setting its filter coefficients, a value obtained after subtracting the calculation result DVWF (n) of the low-pass filter from the wheel acceleration DVW (n) before filtering can be set as the filtered wheel acceleration DVWF. Therefore, the filtered wheel acceleration DVWF in this case will be same as that obtained using the high-pass filter.

Although the road surface condition for four-wheel vehicles has been detected, the road surface condition for vehicles having three wheels or less can also be detected. Such changes and modifications are to be understood as being within the scope of the present invention as defined by the appended claims.

What is claimed is:

1. An anti-skid controller comprising:

wheel braking force application means for applying a braking force to a wheel of a vehicle;

wheel acceleration detection means for generating a wheel acceleration signal representative of a wheel acceleration of said wheel of said vehicle;

high frequency component extraction means for extracting high frequency components no less than 20 Hz of said wheel acceleration signal, said high frequency component extraction means including a differential filter unit for extracting said high frequency components by first extracting low-frequency components of said wheel acceleration signal and then subtracting said low-frequency components from said wheel acceleration signal;

dispersion condition detection means for determining a dispersion value indicative of a dispersion condition of said high frequency components;

road surface condition detection means for determining a road surface condition based on said dispersion value;

setting means for setting a control reference for adjusting said braking force applied to said wheel based on a vehicle speed of said vehicle;

pressure adjustment means for adjusting said braking force applied to said wheel based on said control reference; and correction means for correcting said control reference based on said road surface condition.

2. An anti-skid controller according to claim 1, wherein:

said wheel acceleration detection means is for generating said wheel acceleration signal based on a wheel speed signal from a speed sensor coupled to said wheel.

3. An anti-skid controller according to claim 1, wherein:

said wheel acceleration detection means is for generating a wheel acceleration signal of each wheel of said vehicle;

said high frequency component extraction means extracts high frequency components of said high frequency components of said wheel acceleration signal of each wheel of said vehicle;

said dispersion condition detection means determines a dispersion value indicative of a dispersion condition of said high frequency components of said wheel acceleration signal of each wheel of said vehicle; and said road surface condition detection means detects a road surface condition of each wheel of said vehicle.

4. An anti-skid controller according to claim 1, wherein:

said high frequency component extraction means includes a high-pass filter unit for extracting said high frequency components.

5. An anti-skid controller according to claim 1, wherein:

said high frequency component extraction means includes a bandpass filter unit for extracting said high frequency components.

6. An anti-skid controller according to claim 1, wherein:

said high frequency component extraction means extracts said high frequency components by using filter characteristics that can be adjusted in accordance with at least one of a vehicle speed of said vehicle and a control condition of said vehicle.

7. An anti-skid controller according to claim 1, wherein:

said road surface condition detection means determines said road surface condition by comparing said dispersion value with a determination level that can be adjusted in accordance with at least one of a vehicle speed of said vehicle and a control condition of said vehicle.

8. An anti-skid controller according to claim 1, further comprising:

variation amount computation means for determining a dispersion variation amount of said dispersion value;

wherein said road surface condition detection means further determines said road surface condition based on said dispersion value and said dispersion variation amount.

9. An anti-skid controller according to claim 1, wherein said dispersion value is a variance of said wheel acceleration.

10. An anti-skid controller according to claim 1, wherein said dispersion condition detection means is for determining a variance of said high frequency components as said dispersion value.

11. An anti-skid controller according to claim 10, wherein:

said wheel acceleration detection means generates said wheel acceleration signal based on a wheel speed from a speed sensor coupled to said wheel.

12. An anti-skid controller according to claim 11, wherein:

said road surface condition detection means determining said road surface condition by comparing said variance to a predetermined level that is adjusted in accordance with at least one of a vehicle speed and a control condition of said vehicle.

13. An anti-skid controller according to claim 11, further comprising:

variation amount computation means for determining a variance difference of said variance determined by said dispersion condition detection means, said road surface condition detection means determining said road surface condition based on said variance and said variance difference.

14. An anti-skid controller according to claim 1, wherein said pressure adjustment means is for increasing said braking force applied to said wheel when said road surface condition detection means determines that said road surface condition is poor.

* * * * *